US008743750B2

(12) United States Patent
Tourolle et al.

(10) Patent No.: US 8,743,750 B2
(45) Date of Patent: Jun. 3, 2014

(54) METHOD OF EVALUATING THE RELIABILITY OF A ROUTE IN A COOPERATIVE NETWORK

(75) Inventors: Benjamin Tourolle, Caen (FR); Sylvie Laniepce, Caen (FR)

(73) Assignee: Orange, Paris (FR)

( * ) Notice: Subject to any disclaimer, the term of this patent is extended or adjusted under 35 U.S.C. 154(b) by 334 days.

(21) Appl. No.: 12/440,616

(22) PCT Filed: Sep. 24, 2007

(86) PCT No.: PCT/FR2007/051998
§ 371 (c)(1),
(2), (4) Date: Mar. 10, 2009

(87) PCT Pub. No.: WO2008/037916
PCT Pub. Date: Apr. 3, 2008

(65) Prior Publication Data
US 2009/0262652 A1  Oct. 22, 2009

(30) Foreign Application Priority Data

Sep. 26, 2006  (FR) ...................... 06 53942

(51) Int. Cl.
*H04B 7/00* (2006.01)
(52) U.S. Cl.
USPC ............ 370/310; 370/252; 370/351; 370/389
(58) Field of Classification Search
USPC .................. 370/252, 310, 351, 389, 400, 410
See application file for complete search history.

(56) References Cited

U.S. PATENT DOCUMENTS

| | | | | |
|---|---|---|---|---|
| 7,664,066 | B2* | 2/2010 | Kawaguchi et al. | 370/328 |
| 7,719,988 | B1* | 5/2010 | Ruiz et al. | 370/238 |
| 2004/0165532 | A1* | 8/2004 | Poor et al. | 370/238 |
| 2006/0002366 | A1* | 1/2006 | Kawaguchi et al. | 370/349 |

OTHER PUBLICATIONS

Buchegger et al., "Self-Policing Mobile Ad Hoc Networks by Reputation Systems," IEEE Communications Magazine, IEEE Service Center, New York, NY, US, vol. 43 (7), pp. 101-107 (Jul. 2005).
Jensen et al., "Trust-Based Route Selection in Dynamic Source Routing," Trust Management Lecture Notes in Computer Science, LNCS, Springer-Verlag, Belgium, vol. 3986, pp. 150-163 (May 2006).
Portmann et al., "Mitigating Routing Misbehaviour of Rational Nodes in Chord," International Symposium on Applications and the Internet Workshops, Jan. 26-30, 2004, Saint 2004 Workshops, Piscataway, NJ, USA, IEEE, pp. 503-507 (Jan. 26, 2004).
Yi et al., "Security Aware Ad Hoc Routing for Wireless Networks," Proceeding of the ACM Symposium on Mobile Ad Hoc Networking and Computing (Mobihoc 2001), Online, Long Beach, CA, pp. 1-4, published on the internet site: http://www.cs.huji.ac.il/labs/danss/sensor/adhoc/routing/yi_2001secutiryaware.pdf (May 30, 2007).

* cited by examiner

*Primary Examiner* — Hassan Kizou
*Assistant Examiner* — Ashil Farahmand
(74) *Attorney, Agent, or Firm* — Drinker Biddle & Reath LLP

(57) ABSTRACT

The invention relates to a method of evaluating the reliability of a route in a cooperative network for transmitting packets of data between a source node and a destination node of the network. It includes, on reception by the destination node of a message indicating a route between the two nodes:
  a step of associating the indicated route with a reliability indicator parameter evaluated by the destination node; and
  a step of sending the source node a response including the parameter associated with the indicated route.

16 Claims, 3 Drawing Sheets

METHOD OF EVALUATING THE RELIABILITY OF A ROUTE IN A COOPERATIVE NETWORK

CROSS-REFERENCE TO RELATED APPLICATIONS

This application is the U.S. national phase of the International Patent Application No. PCT/FR2007/051998 filed Sep. 24, 2007, which claims the benefit of French Application No. 06 53942 filed Sep. 26, 2006, the entire content of which is incorporated herein by reference.

FIELD OF THE INVENTION

The invention relates to a technique for evaluating the reliability of a route in a cooperative network for transmitting packets of data between a source node and a destination node of the network.

BACKGROUND OF THE INVENTION

Ad hoc networks are spontaneous wireless networks that do not rely on any particular communications infrastructure. The terminals of these networks, referred to below as nodes, have a two-fold role: to use the network for their own requirements and to contribute to the connectivity between the nodes of the network. These networks are referred to as cooperative networks because the nodes thus serve simultaneously as terminals and as routers for the requirements of other terminals. As used below, the term "route" refers to an ordered list of nodes for routing packets of data between a source node and a destination node. In such networks, a packet of data can be routed by the source node, i.e. the source node combines with a packet to be transmitted the route that the packet must take.

This type of network relies on mechanisms of mutual trust between the nodes. However, a node that is part of a route might prove to be relatively uncooperative or even malicious, and interfere with the routing of packets of data to a greater or lesser degree. Thus reputation management techniques have been proposed for this type of network. A first technique, as described in the paper by S. Marti, T. J. Giuli, K. Lai, M. Baker, "Mitigating Routing Misbehavior in Mobile Ad Hoc Networks", published in the proceedings of the 6th annual ACM/IEEE International Conference on Mobile Computing and Networking 2000, enables each node to supervise the transmission of a packet. When a node receives a packet of data from a source node and to be transmitted to an adjacent node, it transmits it to the adjacent node and, by monitoring the radio channel, it verifies whether that node has forwarded the packet to a subsequent node. If the number of packets not forwarded by that adjacent node exceeds a threshold, the adjacent node is considered malicious and a message is sent to the source node to report the malicious nature of the adjacent node. The same paper also describes a method of administering a trust database that relies on observation of a route. That method requires a protocol for routing by the source. The trust database stores a score for each known cooperative network node, which score identifies the node's contribution to the operation of the network. When a route is valid and being used, the source node periodically updates the scores of the nodes of the route. If, on sending a packet, the route is no longer valid, the scores of the inaccessible nodes are decremented. The node then uses its trust database to select the most reliable route to be used for transmitting packets of data between itself and a destination node.

An alternative technique is proposed in the paper by C. Jensen, P. O'Connell, "Trust-Based Selection in Dynamic Source Routing", published in the proceedings of the iTrust $4^{th}$ international conference, May 2006. When a destination node reports to the source node by means of an acknowledgement that a packet of data has arrived correctly at its destination, the source node increases the trust index values of all the nodes of the route; if not, they are reduced. Thus the source node can calculate a trust index associated with the route as a function of the trust indices of all the nodes of the route, and can select a route as a function of parameters including the trust index.

Thus each source node administers its own trust index database. It must therefore select routes on a trial and error basis, with the possibility of making a bad choice including a malicious node, and it must trust its own experience. As a result of this, selection of the route by the source node is unreliable. There is therefore a need for a technique for use in a cooperative network for ensuring the reliability of a mechanism used by a source node to select routes between the source node and a destination node.

SUMMARY OF THE INVENTION

The invention addresses this need by proposing a method of evaluating the reliability of a route in a cooperative network for transmitting packets of data between a source node and a destination node of the network. The method includes, on reception by the destination node of a message indicating a route between the two nodes:

a step of associating the indicated route with a reliability indicator parameter evaluated by the destination node; and a step of sending the source node a response including the parameter associated with the indicated route.

It should be noted that the invention stems from a problem of trust in a cooperative network. The invention can nevertheless be applied equally to the destination node sending the source node any parameter enabling it to ensure that its selection of the route that it is going to use is reliable.

The destination node receives a route request message sent by a source node and indicating a route between the two nodes. The destination node has information on the nodes of the network that is generally different from that held by the source node. It might be the destination node of a plurality of routes having a plurality of source nodes. It therefore observes the cooperative network from a different angle. On reception of the route request message, it evaluates a reliability indicator parameter to be associated with the route and sends a response combined with this parameter to the source node that sent the route request message. Thus the destination node cooperates with the source node, sharing with it information that it has on the route, to assist the source node to assess if a given route is reliable. Thus the source node obtains a parameter that it can use in a complementary way to local criteria to evaluate the reliability of the route and where appropriate to select it.

The invention is particularly advantageous in the context of hybrid ad hoc networks. These are particular cooperative networks in which one node, administered by an operator, is an access point to a fixed infrastructure network. The nodes of the hybrid ad hoc network cooperate with one another so that those situated out of the radio coverage area of the access point can nevertheless access the infrastructure network. The access point is then a preferred point of passage for calls and corresponds to the destination node of most routes, or even of all routes. This access point is administered by an operator and is therefore a particularly trustworthy node. Its processing capacities may also exceed those of the standard nodes of the cooperative network. The information that it can provide is also deemed reliable, in contrast to information that might be supplied by any of the other nodes.

In one implementation, the reliability indicator parameter associated with the route is evaluated on the basis of information administered by the destination node relating to the nodes of the network, this information belonging to the group comprising a trust index, a load index, a network structure index, and a combination of these indices.

A node of the network, and more particularly an access point in a hybrid ad hoc network, may have complementary information on the nodes of the cooperative network. This information may consist of trust indices that it has evaluated itself, load information that the nodes have sent it, or any other information linked to the architecture of the network. The node in question may also recommend routes via nodes of its own network. By means of this information, the destination node can contribute, as a function of its own information, to the evaluation by the source node of the reliability of a route.

The source node advantageously sends a route request message to a plurality of adjacent nodes, the message being transmitted from node to node in the network to the destination node and progressively indicating the route taken by the message.

The method is particularly advantageous when the destination node receives a plurality of routes after the source node has sent a plurality of route request messages. This can only make it all the more effective. It can then evaluate reliability indicator parameters for each route and send them to the source node.

The source node advantageously receives a plurality of responses from the destination node corresponding to a plurality of routes indicated to the destination node, and there is advantageously a route selection step taking into account at least the respective parameters associated with said routes.

The source node can take account of reliability indicator parameters in various ways. It could base its action only on the received reliability indicator parameter and thus dispense with the administration of a local trust database. Thus, by using only the parameter sent by the destination node to evaluate the reliability of the route, it can save both on the processing capacity necessary to construct the database and on memory resources. It could equally combine this parameter with locally evaluated reliability indicator parameters relating to nodes of the cooperative network. Moreover, exchanges between the two nodes are limited to exchanging reliability indicator parameters associated with the route and exclude reliability indicator parameters associated with the respective nodes of the route.

The invention also relates to a node in a cooperative network, adapted to receive the indication of a route between a source node and itself, including:
  evaluation means for evaluating a reliability indicator parameter for a received route;
  association means, for associating with a route a reliability indicator parameter; and
  sending means for sending said source node a response including the associated parameter.

The invention further relates to a node in a cooperative network, adapted to transmit packets of data to another node of the network, including:
  route search means for sending a route search message to a node of the network; and
  receiver means for receiving a response to the route search message including a route between the node of the network and itself and a reliability indicator parameter associated with the route.

The invention also relates to a system of communication between a plurality of nodes in a cooperative network including a node adapted to receive the indication of a route between a source node and itself, as described above, and a node adapted to send packets of data to another node of the network, as described above.

The invention further relates to a signal sent by one node to another node in a cooperative network in response to a message indicating a route between the two nodes and conveying a response from the one node including a reliability indicator parameter to be used by the other node to evaluate the reliability of the route.

BRIEF DESCRIPTION OF THE DRAWINGS

The invention can be clearly understood in the light of the following description of a method conforming to one particular embodiment of the invention, given with reference to the appended drawings, in which.

DETAILED DESCRIPTION OF THE INVENTION

As used below, the term "route" refers to an ordered list of nodes enabling packets of data to be routed between a source node and a destination node.

Figure 1:
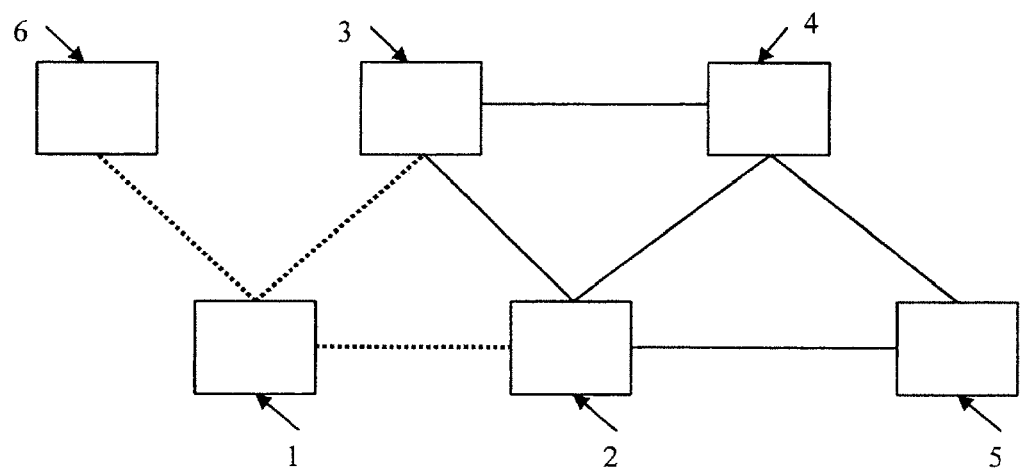
FIG. 1 represents part of a cooperative network.

FIG. 1 represents a cooperative ad hoc network formed by four nodes 2, 3, 4, and 5. A node 6 is not part of the ad hoc network. The nodes 2, 3, 4, and 5 cooperate with one another, and the node 3 communicates with the node 5, with which it has no direct link, via the nodes 2 and 4, for example. These nodes are wireless communications terminals. They may be mobile telephones, personal digital assistants, or personal computers. The links between the nodes shown in FIG. 1 are wireless links. In one particular embodiment of the invention, the node 5 is an access point to an infrastructure network and is administered by an operator. This kind of network is referred to below as a hybrid ad hoc network.

A node 1, referred to below as the source node, is seeking to contact the cooperative network, and more particularly to communicate with the node 5, referred to below as the destination node. The nodes 2, 3, and 6 are within the radio coverage area of the node 1.

Figure 2:
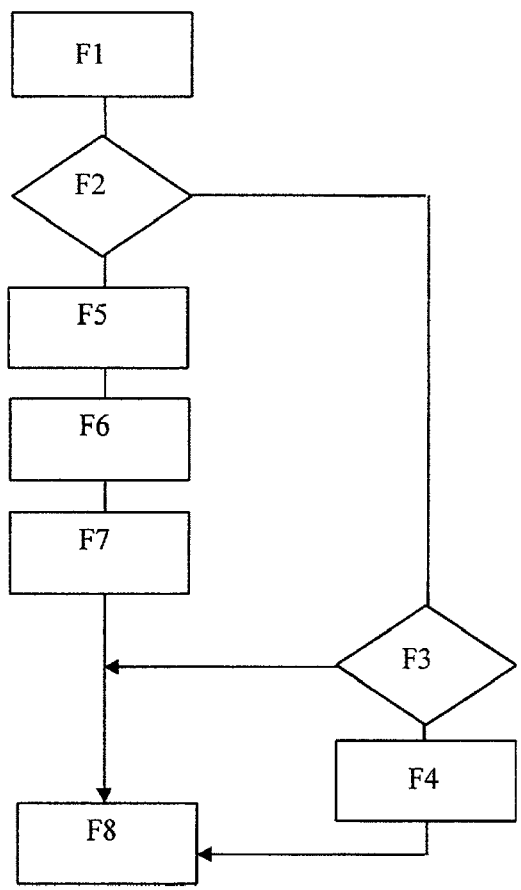
FIG. 2 represents the steps of the method executed in a node of the cooperative network in one particular embodiment of the invention.
Figure 3:
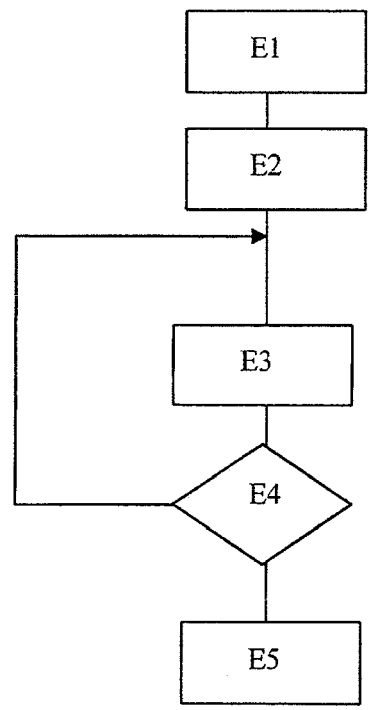
FIG. 3 represents the steps of the method executed in a source node in one particular embodiment of the invention.

The steps of the method of evaluating the reliability of a route for transmitting packets in a cooperative network executed in the source node 1 are described with reference to FIG. 3, and the steps executed in a node of the cooperative network are described with reference to FIG. 2. The situation is one in which packets are subsequently routed in the network by the source node, which indicates the route that the packet must take.

Firstly, the source node 1 executes a step E1 of discovering adjacent nodes that agree to route packets to the destination node 5.

The source node 1 sends the adjacent nodes 2, 3, and 6 an access request message indicating that it is seeking to contact the destination node 5. If one of the adjacent nodes wishes to cooperate, but does not know a route providing access to the destination node 5, it sends in turn an access request message indicating that it is seeking to contact the destination node. If it wishes to cooperate and does know a route providing access to the destination node 5, it responds to the access request message by indicating the number of hops enabling it to reach the destination node 5. The term "hop" refers to the interval between two nodes. For two nodes that are connected directly, the number of hops is one. The source node 1 stores in an adjacency table 104 information including an identification of the adjacent node, a destination node and the number of hops between those two nodes received in the response message to the access request.

In the FIG. 1 example, the source node 1 sends the three adjacent nodes 2, 3, and 6 in its radio coverage area a message requesting access to the destination node 5. The nodes 2 and 3 respond to the access request message, respectively indicating one hop and two hops. The adjacent node 6 does not respond because it does not have any information for contacting the destination node 5 without going via the node 1.

There follows a step E2 of sending a route request. In the step E2, using a local criterion, the source node 1 selects a predetermined number N of adjacent nodes enabling the destination node 5 to be contacted, for example nodes having the fewest possible hops or a high local trust index. Although these messages enable a number of competing routes to be discovered, the predetermined number N can be set at 2, for example, to prevent route request messages saturating the network. The source node sends a route request message to the N selected adjacent nodes containing its identification. It triggers a supervisory time-out T and waits to receive a response.

In a step F1, a node of the cooperative network receives a route request message including an identifier of a source node 1 and an identifier of a destination node 5.

In a step F2, the node 2, 3, 4 verifies whether the identifier of the destination node is its own identifier. If the identifier of the destination node is not its own identifier, in a step F3 the node verifies the number of hops that the route request message has already executed.

If a maximum number of hops has been reached, it does not forward the message and proceeds to the step F8.

If the maximum number of hops has not been reached, in a step F4 it modifies a list of nodes included in the route request message and constructed from node to node, corresponding to the route taken by the route request message, adding its own identifier, and sends the message to a predetermined number M of adjacent nodes of those nodes enabling the destination node to be reached. It then proceeds to the step F8.

If the identifier of the destination node is its own identifier, in other words if it is the intended recipient of the route request message, the destination node 5 stores the list of nodes corresponding to the route taken in a step F5. Then, in a step F6, it evaluates a reliability indicator parameter.

Figure 4:
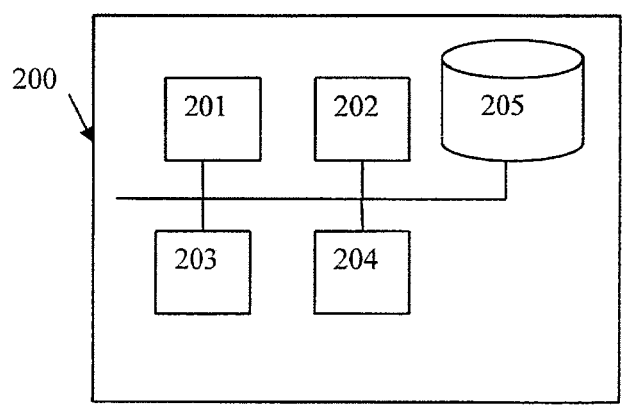
FIG. 4 represents a node of the cooperative network of the invention.

The destination node 5 administers a database 205 (FIG. 4). The database 205 contains records including an identifier of a node and a trust index associated with that node.

The database 205 can optionally also contain information such as a load index for the node or a structure index for the network.

The database 205 is created and updated regularly.

Where the creation and updating of the trust indices are concerned, the method includes a step of updating the information administered by the destination node as a function of the packets of data routed correctly to the destination node via one or more routes. For example the destination node 5 can increment by one unit the trust index of each node of a route when a packet is received over that route. Conversely, if the call fails, the trust index of each node of the route is decremented. An example of a method of this kind is described in the paper by C. Jensen, P. O'Connell, "Trust-Based Selection in Dynamic Source Routing", published in the proceedings of the $4^{th}$ iTrust international conference, May 2006. Note that evaluation of the trust indices by the destination node 5 is particularly advantageous in a hybrid ad hoc network in which the destination node is an access point to the network of an operator.

The load indices of a node can be sent as routing protocol parameters. Thus a node no longer able to communicate correctly on its own behalf requests a reduction in its contribution by sending back a high load index. In this situation, the database 205 contains these load indices.

In one particular embodiment, in which the destination node 5 is an access point to the network of an operator, the database can include a parameter representing a structure index of the network. A maximum value is assigned to a parameter representing a structure index of the network at a node of the network of the operator or whose identifier is known to the operator. Thus a route, even a longer route, can obtain a higher value if it passes through a large number of nodes of the operator. The operator can therefore give preference to routes that pass through nodes of its own network, i.e. nodes whose identifiers it knows.

A parameter representing a structure index of the network can also represent the mobility of the nodes. Preference can thus be given to stable nodes, i.e. nodes that are not particularly mobile.

Thus evaluating a reliability indicator parameter for the route entails evaluating the reliability of the route on the basis of the indices contained in the database 205 for each node that the route crosses.

Following evaluation of the reliability indicator parameter, it is combined with the route and there follows the step F7.

The step F7 entails sending the source node a route response message 10.

Figure 6:
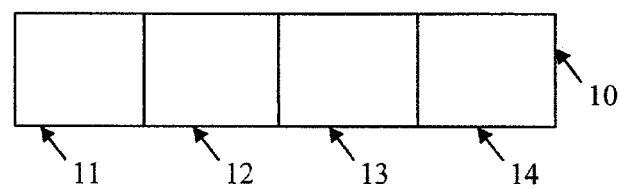
FIG. 6 represents a response message to a route request message of the invention.

As shown in FIG. 6, this message 10 includes an identifier 11 of the node sending the message, an identifier 12 of a route, an identifier 13 of the node that is the intended recipient of the message, and a reliability indicator parameter 14. In the embodiment described above, the node sending the message is the destination node 5 and the destination node of the message is the source node 1. Only one reliability indicator parameter is represented in FIG. 6. There can be embodiments in which the node sending the message adds a plurality of reliability indicator parameters, for example a trust parameter, a load parameter, a network structure parameter or a combination of these parameters. After the node that is the intended recipient of the route response message, i.e. the source node, has received the message, it can take these parameters into account or not during subsequent route selection.

The next step of the method executed at the destination node 5 is the step F8 of waiting to receive a route request message.

The source node 1 sent a predetermined number N of route request messages in the step E2. The destination node 5 receives a plurality of these messages indicating a plurality of respective routes between the source node 1 and the destination node 5. However, the method as described provides for limiting the number of route request messages in order not to saturate the cooperative network with such messages.

The source node 1 is waiting to receive route response messages 10.

In a step E3, it receives a route response message 10. It stores the route included in the field 12 of the message and the reliability indicator parameter(s) included in the field 14 in a working memory that is not represented in FIG. 5.

Then, in a step E4, it verifies if the time-out T has expired.

If not, it returns to waiting to receive a route response message; if the time-out T has expired, it proceeds to a route selection step E5.

In the route selection step E5, the source node 1 takes into account the reliability indicator parameters that it has stored in the working memory to select a route to the destination node. For example, it selects the route with the highest reliability indicator parameter. As a function of the number of reliability indicator parameters associated with each route and sent by the destination node, the source node 1 can combine these parameters in accordance with its own criteria.

Thus the source node selects a route as a function of information evaluated by another node. This solution avoids the administration of a local database and the evaluation of trust indices by the source node. In a hybrid cooperative network, the access point is the destination node of a plurality of routes, its information is therefore more reliable, and its processing capacities can be greater. Moreover, knowing a plurality of routes enables the source node to circumvent any malicious nodes more easily.

Figure 5:
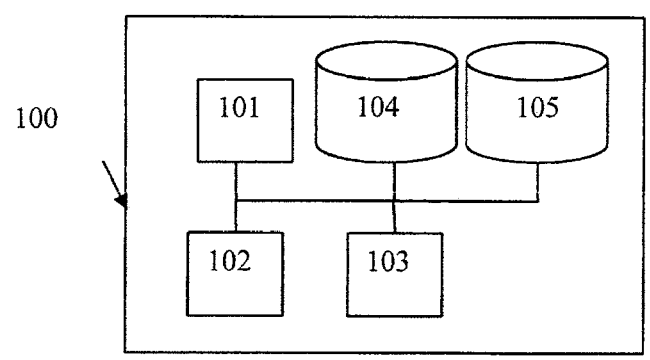
FIG. 5 represents a source node of the cooperative network of the invention.

In a variant, the source node 1 also takes into account trust indices that it has evaluated and stored in a local database associating trust indices with nodes (the database 105 in FIG. 5). Thus it evaluates its own reliability indicator parameter for each route and combines it in accordance with its own criteria with the trust parameter(s) received from the destination node.

In one particular implementation, the step E1 is not executed and, in the step E2, the source node 1 broadcasts a route request message containing its identifier and triggers a supervisory time-out T. The other steps are identical to those described above.

Note that using the route response message to send the source node a reliability indicator parameter also has the advantage of avoiding further exchange of information between the source node and the destination node.

Note also that the program can be executed using the Dynamic Source Routing (DSR) protocol. The particular embodiment described above applies in this situation. Moreover, in the step F3, the node verifies whether it has already received the route request message before forwarding it. The other steps of the method are unchanged. Consequently, the number of route request messages is smaller than when using the method as described, but the invention is still advantageous for evaluating the reliability of a route.

A destination node is described below with reference to FIG. 4.

Referring to FIG. 4, a destination node 200 includes:
means 201 for receiving a message indicating a route between a source node and itself;
evaluation means 202 for evaluating a reliability indicator parameter for a route received by the receiver means;
association means 203, for associating with a route a reliability indicator parameter evaluated by the evaluation means; and
sending means 204 for sending the source node a response including the associated parameter.

The destination node optionally includes a database 205 of records including an identifier of a node and information relating to the nodes of the network, this information belonging to the group comprising a trust index, a load index, a network structure index, and a combination of those indices.

A source node is described below with reference to FIG. 5.

Referring to FIG. 5, the source node 100 includes:
route search means 101 for sending a route search message to a node of the network; and
receiver means 102 for receiving a response 10 to the route search message including a route between the node of the network and itself and a reliability indicator parameter associated with the route.

The source node also includes route selection means 103 for selecting a route from a plurality of routes taking into account at least the parameters respectively associated with the plurality of routes.

In one embodiment, the source node also includes an adjacency table 104 for storing adjacent nodes and the number of hops necessary to reach a destination node.

The source node optionally further includes a local database 105 associating trust indices and nodes.

The modules 101, 102, 103 that execute the method described above are preferably software modules including software instructions for executing those of the steps of the method described above that are executed by the source node 100.

The modules 201, 202, 203, 204 that execute the method described above are preferably software modules including software instructions for executing those of the steps of the method described above that are executed by the destination node 200.

The software modules can be stored or transmitted by a data medium, which can be a hardware storage medium, for example a CD-ROM, a magnetic diskette or a hard disk, or a transmission medium such as an electrical, optical or radio signal, or a telecommunications network.

The invention also relates to a system of communication between a plurality of nodes in a cooperative network including a destination node 200 as described above and a source node 100 as described above.

The invention claimed is:

1. A method of evaluating the reliability of a route in a cooperative network for transmitting packets of data between a source node and a destination node of the network, comprising, on reception by the destination node of a message indicating a route between the two nodes:
a step of evaluating a reliability indicator parameter value for the indicated route based on stored trust indices respectively associated with nodes in the indicated route;
a step of associating the indicated route with the reliability indicator parameter value evaluated by the destination node; and
a step of sending the source node a response including the reliability indicator parameter value associated with the indicated route,
wherein the reliability indicator parameter value associated with the indicated route is evaluated based on information administered by the destination node relating to nodes of the network, said information comprising at least one of a load index of a node in the indicated route and a network structure index,
wherein the load index increases when contribution to communications by the node increases, and the reliability indicator parameter value for the indicated route decreases when the load index increases, and wherein the network structure index increases when a number of operator administered nodes, through which the indicated route passes, increases, and the reliability indicator parameter value for the indicated route increases when the network structure index increases.

2. A method according to claim 1, wherein said information administered by the destination node relating to the nodes of the network also comprises a trust index.

3. A method according to claim 1, wherein the message comprises one of a plurality of route request messages the source node sends to respective ones of a plurality of adjacent nodes, each of the route request messages being transmitted from node to node in the network to the destination node and progressively indicating a respective route taken by the route request message.

4. A tangible article of manufacture comprising a non-transitory computer-readable storage medium storing instructions that, when executed, cause the source node of claim 3 to at least send the route request message to the plurality of adjacent nodes.

5. A method according to claim 1, wherein the source node receives a plurality of responses from the destination node corresponding to a plurality of routes indicated to the destination node, and performs a route selection step taking into account at least the respective parameters associated with said indicated routes.

6. A tangible article of manufacture comprising a non-transitory computer-readable storage medium storing instructions that, when executed, cause the source node of claim 5 to at least:
receive the plurality of responses from the destination node; and
perform the route selection step.

7. A method according to claim 1, further comprising a step of updating information administered by the destination node as a function of packets of data routed correctly to the destination node via at least one route.

8. A method according to claim 1, wherein evaluating the reliability indicator parameter value for the indicated route based on the stored trust indices comprises at least one of computing or generating the reliability indicator parameter value from the stored trust indices.

9. A tangible article of manufacture comprising a non-transitory computer-readable storage medium storing instructions that, when executed, cause the destination node to execute at least the method of claim 1.

10. A node in a cooperative network adapted to receive an indication of a route between a source node and itself, comprising:
evaluation means for evaluating a reliability indicator parameter value for the route received by a receiver means;
association means, for associating with the route a reliability indicator parameter value evaluated by the evaluation means; and
sending means for sending the source node a response including the associated parameter value,
wherein the reliability indicator parameter value associated with the indicated route is evaluated based on information relating to nodes of the indicated route, said information comprising at least one of a load index of a node in the indicated route and a network structure index,
wherein the load index increases when contribution to communications by the node increases, and the reliability indicator parameter value for the indicated route decreases when the load index increases, and
wherein the network structure index increases when a number of operator administered nodes, through which the indicated route passes, increases, and the reliability indicator parameter value for the indicated route increases when the network structure index increases.

11. A system of communication between a plurality of nodes in the cooperative network comprising at least one node according to claim 10.

12. A node according to claim 10, the node further including a tangible article of manufacture comprising a computer-readable storage medium storing instructions that, when executed, cause a processor of the node to implement at least the evaluation means and the association means.

13. A node according to claim 10, wherein the information relating to the nodes of the indicated route also comprises a trust index.

14. A first node in a cooperative network, adapted to transmit packets of data to a second node of the network, comprising:
route search means for sending a route search message to the second node of the network; and
receiver means for receiving a response to the route search message including a route between the second node of the network and itself and a reliability indicator parameter value associated with the route, the reliability indicator parameter value being computed at the second node,
wherein the reliability indicator parameter value associated with the route is evaluated based on information administered by the second node relating to nodes of the route, said information comprising at least one of a load index of a node in the indicated route and a network structure index,
wherein the load index increases when contribution to communications by the node increases, and the reliability indicator parameter value for the indicated route decreases when the load index increases, and
wherein the network structure index increases when a number of operator administered nodes, through which the indicated route passes, increases, and the reliability indicator parameter value for the indicated route increases when the network structure index increases.

15. A system of communication between a plurality of nodes in the cooperative network comprising at least one node according to claim 14.

16. A node according to claim 14, wherein the information relating to the nodes of the route also comprises a trust index.

* * * * *